United States Patent
Xu et al.

(10) Patent No.: US 10,397,937 B2
(45) Date of Patent: Aug. 27, 2019

(54) METHOD AND DEVICE FOR SCHEDULING SINGLE-CELL MULTIMEDIA BROADCAST AND MULTICAST SERVICE

(71) Applicant: ZTE Corporation, Shenzhen (CN)

(72) Inventors: Hui Xu, Shenzhen (CN); Zijiang Ma, Shenzhen (CN); Yaying Wang, Shenzhen (CN); Yutang Xie, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 15/550,948

(22) PCT Filed: Jan. 21, 2016

(86) PCT No.: PCT/CN2016/071627
§ 371 (c)(1),
(2) Date: Aug. 14, 2017

(87) PCT Pub. No.: WO2016/127772
PCT Pub. Date: Aug. 18, 2016

(65) Prior Publication Data
US 2018/0042033 A1   Feb. 8, 2018

(30) Foreign Application Priority Data
Feb. 13, 2015  (CN) .......................... 2015 1 0081034

(51) Int. Cl.
*H04W 4/06* (2009.01)
*H04W 72/12* (2009.01)
(Continued)

(52) U.S. Cl.
CPC .......... *H04W 72/121* (2013.01); *H04L 1/004* (2013.01); *H04W 4/06* (2013.01); *H04W 72/005* (2013.01);
(Continued)

(58) Field of Classification Search
CPC ... H04W 72/005; H04W 4/06; H04W 72/042; H04W 4/08; H04W 72/04; H04W 72/1278
See application file for complete search history.

(56) References Cited

U.S. PATENT DOCUMENTS 8,902,884 B2 * 12/2014 Wang .................. H04W 72/005
                                                      312/324
8,913,538 B2 * 12/2014 Lee ....................... H04W 28/06
                                                      370/310
(Continued)

FOREIGN PATENT DOCUMENTS

CN     101808281 A    8/2010
CN     101841773 A    9/2010
(Continued)

OTHER PUBLICATIONS

International Search Report for corresponding application PCT/CN2016/071627 filed on Jan. 21, 2016; dated Apr. 26, 2016.
(Continued)

*Primary Examiner* — Mohamed A Kamara
(74) *Attorney, Agent, or Firm* — Cantor Colburn LLP

(57) ABSTRACT

The disclosure provides a scheduling method and device for a single-cell Multimedia Broadcast and Multicast Service (MBMS). The method includes: receiving a Single Cell-Point To Multipoint (SC-PTM) Single cell-Multicast Control Channel (S-MCCH) message sent by an evolved Node B (eNB), wherein the S-MCCH message carries first Radio Network Temporary Identifier (RNTI) configuration infor-
(Continued)

--- receive an SC-PTM S-MCCH message sent by an eNB, wherein the S-MCCH message carries first RNTI configuration information and/or second RNTI configuration information, a first RNTI corresponding to the first RNTI configuration information is used for indicating that a single-cell MBMS is scheduled by using a semi-static scheduling manner, the first RNTI configuration information is used for indicating a TMGI corresponding to the first RNTI and a subframe position where a PDCCH scrambled by using the first RNTI is located, a second RNTI is used for indicating that the single-cell MBMS is scheduled by using a dynamic scheduling manner, and the second RNTI configuration information is used for indicating a TMGI corresponding to the second RNTI  — S302

↓ receive an MBMS required on a PDSCH according to the scheduling information received on the PDCCH scrambled by the first RNTI and/or received on the PDCCH scrambled by the second RNTI  — S304 mation and/or second RNTI configuration information, a first RNTI is used for indicating that a single-cell MBMS is scheduled by using a semi-static scheduling manner, the first RNTI configuration information is used for indicating a Temporarily Mobile Group Identifier (TMGI) corresponding to the first RNTI and a subframe position where a Physical Downlink Control Channel (PDCCH) scrambled by using the first RNTI is located, a second RNTI is used for indicating that the single-cell MBMS is scheduled by using a dynamic scheduling manner, and the second RNTI configuration information is used for indicating a TMGI corresponding to the second RNTI; and receiving an MBMS required on a Physical Downlink Shared Channel (PDSCH) according to scheduling information received on the PDCCH. By using the technical solution, a single-cell MBMS can be scheduled.

17 Claims, 9 Drawing Sheets

(51) Int. Cl.
H04L 1/00 (2006.01)
H04W 72/00 (2009.01)
H04L 12/18 (2006.01)
H04W 72/04 (2009.01)

(52) U.S. Cl.
CPC ........ *H04L 1/0038* (2013.01); *H04L 12/1881* (2013.01); *H04W 72/042* (2013.01)

(56) References Cited

U.S. PATENT DOCUMENTS

| | | | |
|---|---|---|---|
| 9,319,851 B2* | 4/2016 | Yu | H04W 4/08 |
| 2013/0308516 A1* | 11/2013 | Zeng | H04L 5/0098 370/312 |
| 2014/0286222 A1 | 9/2014 | Yu | |
| 2017/0325198 A1* | 11/2017 | Adachi | H04W 4/06 |

FOREIGN PATENT DOCUMENTS

| | | |
|---|---|---|
| WO | 2011020027 A1 | 2/2011 |
| WO | 2013025235 A1 | 2/2013 |

OTHER PUBLICATIONS

European Search Report for corresponding application EP16748573: Report dated Oct. 19, 2017.
Huawei,RP-141920: Motivation of Rel-13 New Study Item proposal for Support of single-cell point-to-multipoint transmission in LTE, Huawei, HiSilicon, URL: www.huawei.com, Dec. 2, 2014, XP050898627.

* cited by examiner

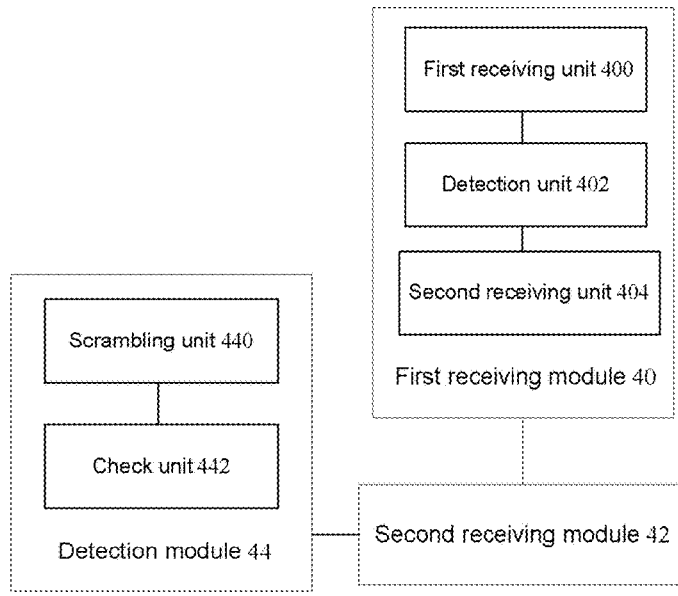

Fig. 5 send an SC-PTM S-MCCH message to a UE, wherein the S-MCCH message carries: first RNTI configuration information and/or second RNTI configuration information, a first RNTI corresponding to the first RNTI configuration information is used for indicating that a single-cell MBMS is scheduled by using a semi-static scheduling manner, the first RNTI configuration information is used for indicating a TMGI corresponding to the first RNTI and a subframe position where a PDCCH scrambled by using the first RNTI is located, a second RNTI is used for indicating that the single-cell MBMS is scheduled by using a dynamic scheduling manner, and the second RNTI configuration information is used for indicating a TMGI corresponding to the second RNTI — S602 schedule a single-cell MBMS according to a scheduling manner indicated by the S-MCCH message — S604

METHOD AND DEVICE FOR SCHEDULING SINGLE-CELL MULTIMEDIA BROADCAST AND MULTICAST SERVICE

TECHNICAL FIELD

The disclosure relates to the field of communications, and more particularly to a method and device for scheduling a single-cell Multimedia Broadcast and Multicast Service (MBMS).

BACKGROUND

With the rapid development of Internet and the popularization of large-screen multifunctional mobile terminals, a great number of mobile data multimedia services and various high-bandwidth multimedia services, such as video sessions, television broadcasts, video on demand, advertisements, online education and interactive games, emerge. Not only multi-service demands of a mobile user are met, but also a new service increasing point is brought to a mobile operator. These mobile data multimedia services require multiple users to be able to receive the same data simultaneously. Compared with general data services, the mobile data multimedia services have the characteristics of large data volume, long duration, delay sensitivity and the like.

In order to effectively utilize mobile network resources, a 3rd Generation Partnership Project (3GPP) proposes an MBMS. The service is a technology of transmitting data from a data source to multiple target mobile terminals, thereby sharing resources of a network (including a core network and an access network), and improving the utilization rate of network resources (particularly air interface resources). The MBMS defined by the 3GPP not only can realize plain-text low-rate message multicast and broadcast, but also can realize high-speed multimedia service broadcast and multicast, and various rich videos, audios and multimedia services are provided, which complies with the future development trend of mobile data without doubt and provides a better service prospect for 3G development.

The MBMS has the characteristics of large service data volume, long receiving duration of a mobile terminal and constant average data rate. The above-mentioned characteristics determine that scheduling and control signaling configurations of the MBMS are semi-static. That is, scheduling information and control signaling information of the MBMS remain unchanged 'for a long time'. These pieces of information are periodically sent through an MBMS Control Channel (MCCH), and are collectively referred to as MCCH information. An evolved MBMS (eMBMS) system may have multiple MCCHs, each MCCH corresponding to different MBMS Single Frequency Network (MBSFN) regions, wherein control information of the MBMS sent by the corresponding MBSFN region is only borne.

In a Long Term Evolution (LTE) system, a notification about that a certain MBMS will be subjected to session start or a network side initiates a counting request is given to a User Equipment (UE) (or referred to as a terminal), Downlink Control Information (DCI) and an MBMS-Radio Network Temporary Identifier (RNTI) may be sent on a Physical Downlink Control Channel (PDCCH) first. The UE further reads a specific MCCH message according to relevant information in the DCI, which is referred to as an MCCH change notification mechanism. Specific service configuration parameters such as a service ID, service Radio Link Control (RLC), Media Access Control (MAC) and physical layer configuration parameters will be sent on the MCCH.

The 3GPP proposes a research project about a single-cell MBMS in LTE-Advanced (LTE-A) of a Release 13 (R13) version, wherein the single-cell MBMS is transmitted on a Physical Downlink Shared Channel (PDSCH).

FIG. 1 is a channel diagram illustrating that a PDCCH occupies three symbols in a subframe in the related art. Information transmitted in the PDCCH is referred to as DCI for indicating resource configurations of the PDSCH, an uplink resource license, and other pieces of information. A Cyclic Redundancy Check code (CRC) at the tail of the PDCCH is 16 bits, and is scrambled by using a specific RNTI, the RNTI being used for identifying the UE or a specific purpose. It is important to note that in FIG. 1, RS is the abbreviation of Reference Signal, PBCH is the abbreviation of Physical Broadcast Channel, PCFICH is the abbreviation of Physical Control Format Indication Channel, PHICH is the abbreviation of Physical Hybrid ARQ Indicator Channel, ARQ is the abbreviation of Automatic Repeat Request (ARQ), and PDSCH is the abbreviation of Physical Downlink Shared Channel (PDSCH).

In research and practice processes of the conventional art, the inventor finds that the conventional art has the following problems. Single-cell MBMS scheduling (as shown in FIG. 2) is greatly different from multi-cell MBMS (MBSFN) scheduling: PDSCH scheduling information of the single-cell MBMS scheduling is transmitted on the PDCCH, and scheduling information of a Physical Multicast Channel (PMCH) is transmitted on Multicast Channel (MCH) Scheduling Information (MSI). Therefore, a multi-cell MBMS scheduling method cannot be adopted in the single-cell MBMS scheduling, and in view of difference between the MBMS and a unicast service, it is improper to dynamically schedule the MBMS on the PDCCH of each subframe.

Any effective solution has not been proposed yet for the technical problem in the related art where there is no technical solution for implementing a scheduling process suitable for a single-cell MBMS.

SUMMARY

In order to solve the above-mentioned technical problem, the embodiments of the disclosure provide methods and devices for scheduling a single-cell MBMS.

According to one embodiment of the disclosure, a method for scheduling a single-cell MBMS is also provided. The method includes: receiving a Single Cell-Point To Multipoint (SC-PTM) Single cell-Multicast Control Channel (S-MCCH) message sent by an evolved Node B (eNB), wherein the S-MCCH message carries first RNTI configuration information and/or second RNTI configuration information, a first RNTI corresponding to the first RNTI configuration information is used for indicating that a single-cell MBMS is scheduled by using a semi-static scheduling manner, the first RNTI configuration information is used for indicating a Temporarily Mobile Group Identifier (TMGI) corresponding to the first RNTI and a subframe position where a PDCCH scrambled by using the first RNTI is located, a second RNTI is used for indicating that the single-cell MBMS is scheduled by using a dynamic scheduling manner, and the second RNTI configuration information is used for indicating a TMGI corresponding to the second RNTI; and receiving an MBMS required on a PDSCH according to scheduling information received on the PDCCH scrambled by the first RNTI and/or a PDCCH scrambled by the second RNTI.

In the embodiment of the disclosure, receiving an S-MCCH message sent by an eNB includes: receiving a broadcast message and/or an MCCH message sent by the eNB, the broadcast message or the MCCH message including: a subframe position of an S-MCCH message, and an RNTI corresponding to the S-MCCH message; detecting the S-MCCH message at the subframe position of the S-MCCH message indicated by the broadcast message and/or the MCCH message according to the RNTI corresponding to the S-MCCH message; and receiving the S-MCCH message.

In the embodiment of the disclosure, the first RNTI configuration information includes: a mapping relation between a TMGI and the first RNTI, and a time domain position of the first RNTI; and the second RNTI configuration information includes: a mapping relation between a TMGI and the second RNTI, the TMGI being used for identifying the MBMS.

In the embodiment of the disclosure, the time domain position includes: a repetition period of a frame where the first RNTI is located, and a subframe offset of the first RNTI.

In the embodiment of the disclosure, the PDCCH scrambled by the first RNTI and/or the PDCCH scrambled by the second RNTI are/is stored in a common search space.

In the embodiment of the disclosure, after receiving the S-MCCH message sent by the eNB, the method further includes:

blindly detecting a PDCCH for a UE at a subframe position where the S-MCCH message is located or a subframe position indicated by the S-MCCH message.

In the embodiment of the disclosure, blindly detecting a PDCCH for a UE at a subframe position where the S-MCCH message is located or a subframe position indicated by the S-MCCH message includes:

scrambling a CRC of a PDCCH detected, by the UE, at a subframe according to the first RNTI configuration information and/or the second RNTI configuration information in the S-MCCH message, and checking scrambled data, wherein when check succeeds, the current PDCCH that is blindly detected is determined as a required PDCCH.

In the embodiment of the disclosure, the scheduling information is carried in DCI, and the method further includes:

when a scheduling manner indicated by the S-MCCH message is a semi-static scheduling manner, scrambling a PDCCH through the first RNTI configuration information, and carrying information for indicating activation of the semi-static scheduling manner and frequency domain scheduling information in the DCI; or when the scheduling manner indicated by the S-MCCH message is a semi-static scheduling manner, scrambling a PDCCH through the first RNTI configuration information, and carrying information for indicating release of the semi-static scheduling manner in the DCI.

In the embodiment of the disclosure, the method further includes:

when the semi-static scheduling manner has been activated, directly reading, by the UE, an MBMS required on a PDSCH in a detected subframe where the first RNTI is located; and when the scheduling manner indicated by the S-MCCH message is a dynamic scheduling manner, reading, by the UE, dynamic scheduling information in a PDCCH in each detected subframe where the second RNTI is located, and then reading an MBMS required on a PDSCH.

In the embodiment of the disclosure, the method further includes:

when the scheduling manner indicated by the S-MCCH message is the semi-static scheduling manner, if a first RNTI acquired through the S-MCCH message is different from the first activated RNTI, reading MBMS scheduling information corresponding to the first RNTI acquired through the S-MCCH message.

In the embodiment of the disclosure, the method further includes:

receiving a broadcast message and/or an MCCH message sent by the eNB and used for indicating a third RNTI; and scrambling the S-MCCH message and a PDCCH of an S-MTCH multiplexing subframe through the third RNTI.

In the embodiment of the disclosure, the method further includes:

when each S-MTCH corresponds to a specified third RNTI, indicating a mapping relation between a TMGI and the third RNTI through the MCCH message or the S-MCCH message.

According to another embodiment of the disclosure, a method for scheduling a single-cell MBMS is also provided. The method includes: sending an SC-PTM S-MCCH message to a UE, wherein the S-MCCH message carries: first RNTI configuration information and/or second RNTI configuration information, a first RNTI corresponding to the first RNTI configuration information is used for indicating that a single-cell MBMS is scheduled by using a semi-static scheduling manner, the first RNTI configuration information is used for indicating a TMGI corresponding to the first RNTI and a subframe position where a PDCCH scrambled by using the first RNTI is located, a second RNTI is used for indicating that the single-cell MBMS is scheduled by using a dynamic scheduling manner, and the second RNTI configuration information is used for indicating a TMGI corresponding to the second RNTI; and scheduling a single-cell MBMS according to a scheduling manner indicated by the S-MCCH message.

In the embodiment of the disclosure, sending an SC-PTM S-MCCH message to a UE includes: sending a broadcast message and/or an MCCH message to the UE, the broadcast message and/or the MCCH message being used for indicating a time domain position of an S-MCCH message and an RNTI corresponding to the S-MCCH message.

In the embodiment of the disclosure, the first RNTI configuration information includes: a mapping relation between a TMGI and the first RNTI, and a time domain position of the first RNTI; and the second RNTI configuration information includes: a mapping relation between a TMGI and the second RNTI, the TMGI being used for identifying the MBMS.

In the embodiment of the disclosure, the time domain position includes: a repetition period of a frame where the first RNTI is located, and a subframe offset of the first RNTI.

According to a further embodiment of the disclosure, a device for scheduling a single-cell MBMS is also provided. The device includes: a first receiving module, configured to receive an SC-PTM S-MCCH message sent by an eNB, wherein the S-MCCH message carries first RNTI configuration information and/or second RNTI configuration information, a first RNTI corresponding to the first RNTI configuration information is used for indicating that a single-cell MBMS is scheduled by using a semi-static scheduling manner, the first RNTI configuration information is used for indicating a TMGI corresponding to the first RNTI and a subframe position where a PDCCH scrambled by using the first RNTI is located, a second RNTI is used for indicating that the single-cell MBMS is scheduled by using a dynamic scheduling manner, and the second RNTI configuration information is used for indicating a TMGI corresponding to the second RNTI; and a second receiving module, configured to receive an MBMS required on a PDSCH according to scheduling information received on the PDCCH scrambled by the first RNTI and/or a PDCCH scrambled by the second RNTI.

In the embodiment of the disclosure, the first receiving module includes: a first receiving unit, configured to receive a broadcast message and/or an MCCH message sent by the eNB, the broadcast message or the MCCH message including: a subframe position of an S-MCCH message, and an RNTI corresponding to the S-MCCH message; a detection unit, configured to detect the S-MCCH message at the subframe position of the S-MCCH message indicated by the broadcast message and/or the MCCH message according to the RNTI corresponding to the S-MCCH message; and a second receiving unit, configured to receive the S-MCCH message.

In the embodiment of the disclosure, the first RNTI configuration information received by the first receiving module includes: a mapping relation between a TMGI and the first RNTI, and a time domain position of the first RNTI; and the second RNTI configuration information includes: a mapping relation between a TMGI and the second RNTI, the TMGI being used for identifying the MBMS.

In the embodiment of the disclosure, the time domain position received by the first receiving module includes: a repetition period of a frame where the first RNTI is located, and a subframe offset of the first RNTI.

In the embodiment of the disclosure, the device further includes: a detection module, configured to blindly detect a PDCCH for a UE at a subframe position where the S-MCCH message is located or a subframe position indicated by the S-MCCH message.

In the embodiment of the disclosure, the detection module includes: a scrambling unit, configured to scramble a CRC of a PDCCH detected, by the UE, at a subframe according to the first RNTI configuration information and/or the second RNTI configuration information in the S-MCCH message; and a check unit, configured to check scrambled data, wherein when check succeeds, the current PDCCH that is blindly detected is determined as a required PDCCH.

According to a yet further embodiment of the disclosure, a device for scheduling a single-cell MBMS is also provided. The device includes: a sending module, configured to send an SC-PTM S-MCCH message to a UE, wherein the S-MCCH message carries: first RNTI configuration information and/or second RNTI configuration information, a first RNTI corresponding to the first RNTI configuration information is used for indicating that a single-cell MBMS is scheduled by using a semi-static scheduling manner, the first RNTI configuration information is used for indicating a TMGI corresponding to the first RNTI and a subframe position where a PDCCH scrambled by using the first RNTI is located, a second RNTI is used for indicating that the single-cell MBMS is scheduled by using a dynamic scheduling manner, and the second RNTI configuration information is used for indicating a TMGI corresponding to the second RNTI; and a scheduling module, configured to schedule a single-cell MBMS according to a scheduling manner indicated by the S-MCCH message.

In the embodiment of the disclosure, the sending module is configured to send a broadcast message and/or an MCCH message to the UE, the broadcast message and/or the MCCH message being used for indicating a time domain position of an S-MCCH message and an RNTI corresponding to the S-MCCH message.

The embodiments of the disclosure adopt the following technical means: receiving an SC-PTM S-MCCH message sent by an eNB, wherein the S-MCCH message carries first RNTI configuration information and/or second RNTI configuration information, a first RNTI is used for indicating that a single-cell MBMS is scheduled by using a semi-static scheduling manner, the first RNTI configuration information is used for indicating a TMGI corresponding to the first RNTI and a subframe position where a PDCCH scrambled by using the first RNTI is located, a second RNTI is used for indicating that the single-cell MBMS is scheduled by using a dynamic scheduling manner, and the second RNTI configuration information is used for indicating a TMGI corresponding to the second RNTI; and receiving an MBMS required on a PDSCH according to scheduling information received on the PDCCH scrambled by the first RNTI and/or a PDCCH scrambled by the second RNTI. The technical problem in the related art where there is no technical solution for implementing a scheduling process suitable for a single-cell MBMS is solved, thus avoiding a UE in a single cell from frequently decoding MBMS scheduling information, reducing the power consumption of the UE for receiving a single-cell MBMS, and implementing semi-static scheduling of the MBMS.

BRIEF DESCRIPTION OF THE DRAWINGS

The drawings described herein are adopted to provide further understanding of the disclosure, and form a part of the present application. The schematic embodiments and description of the disclosure are adopted to explain the disclosure, and do not form limits to the disclosure. In the drawings:

FIG. 5 is another block diagram of a scheduling device for a single-cell MBMS according to an embodiment of the disclosure;

FIG. 6 is a flowchart of a scheduling method for a single-cell MBMS according to an embodiment of the disclosure;

DETAILED DESCRIPTION OF THE EMBODIMENTS

The disclosure will be illustrated hereinbelow with reference to the drawings and in conjunction with the embodiments in detail. It is important to note that embodiments in the present application and features in the embodiments may be combined under the condition of no conflicts.

Other features and advantages of the disclosure will be elaborated in the following description, and, are partially obvious from the description or understood by implementing the disclosure. Purposes and other advantages of the disclosure can be implemented and obtained by means of structures specially pointed out in the written description, the claims and the drawings.

In order to make those skilled in the art better understand the solutions of the disclosure, the technical solutions in the embodiments of the disclosure will be clearly and completely described hereinbelow with reference to the drawings in the embodiments of the disclosure. Obviously, the described embodiments are only a part of the embodiments of the disclosure, not all of the embodiments. On the basis of the embodiments in the disclosure, all other embodiments obtained on the premise of no creative work of those skilled in the art should fall within the scope of protection of the disclosure.

Figure 1:
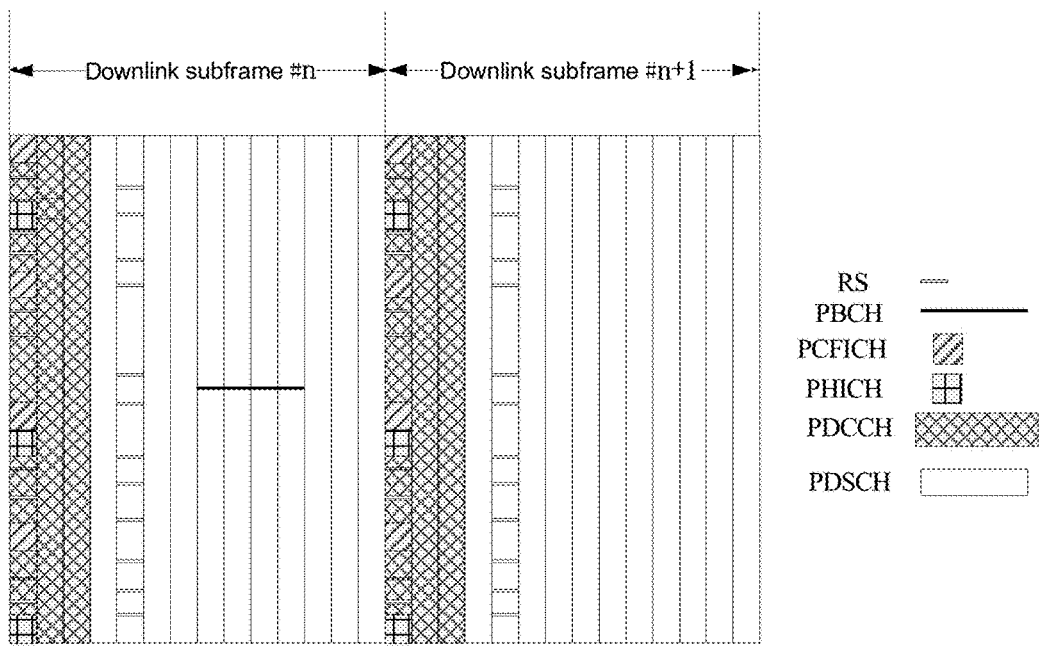
FIG. 1 is a channel diagram illustrating that a PDCCH occupies three symbols in a subframe in the related art.
Figure 2:
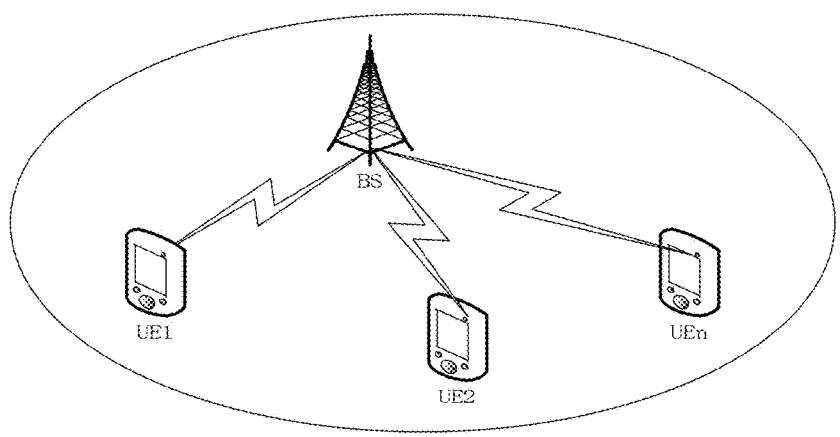
FIG. 2 is a structure diagram of a single-cell MBMS in the related art.
Figure 3:
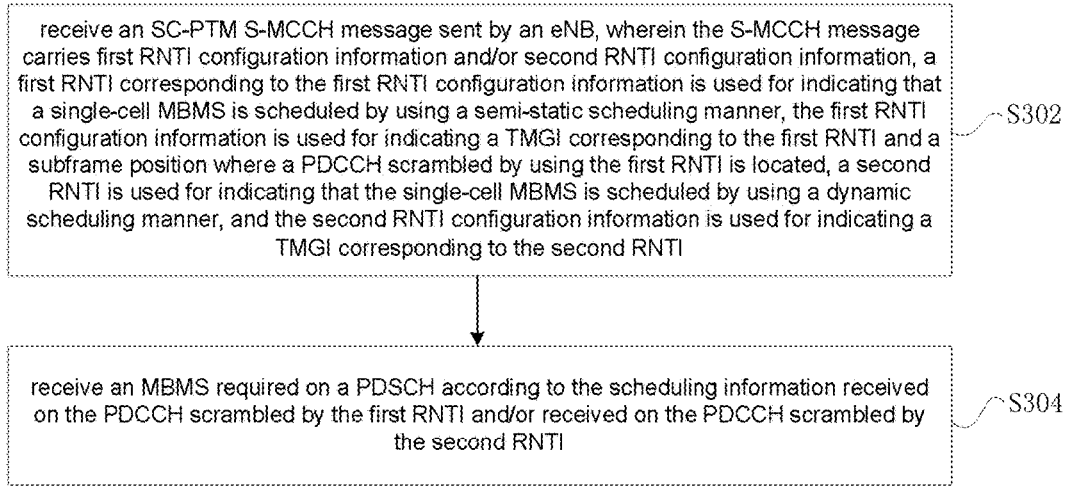
FIG. 3 is a flowchart of a scheduling method for a single-cell MBMS according to an embodiment of the disclosure.

In the present embodiment, a method for scheduling a single-cell MBMS is provided. FIG. 3 is a flowchart of a scheduling method for a single-cell MBMS according to an embodiment of the disclosure. As shown in FIG. 3, the method includes the steps as follows.

Step S302: An SC-PTM S-MCCH message sent by an eNB is received, wherein the S-MCCH message carries first RNTI configuration information and/or second RNTI configuration information, a first RNTI corresponding to the first RNTI configuration information is used for indicating that a single-cell MBMS is scheduled by using a semi-static scheduling manner, the first RNTI configuration information is used for indicating a TMGI corresponding to the first RNTI and a subframe position where a PDCCH scrambled by using the first RNTI is located, a second RNTI is used for indicating that the single-cell MBMS is scheduled by using a dynamic scheduling manner, and the second RNTI configuration information is used for indicating a TMGI corresponding to the second RNTI.

Step S304: An MBMS required on a PDSCH is received according to scheduling information received on the PDCCH scrambled by the first RNTI and/or a PDCCH scrambled by the second RNTI.

By means of each of the above-mentioned steps, the technical means of receiving an S-MCCH message that is sent by an eNB and carries first RNTI configuration information and/or second RNTI configuration information and further receiving an MBMS required on a PDSCH according to scheduling information received on a PDCCH scrambled by a first RNTI and/or a PDCCH scrambled by a second RNTI is adopted. The technical problem in the related art where there is no technical solution for implementing a scheduling process suitable for a single-cell MBMS is solved, thus avoiding a UE in a single cell from frequently decoding MBMS scheduling information, reducing the power consumption of the UE for receiving a single-cell MBMS, and implementing semi-static scheduling of the MBMS.

Step S302 may be implemented in multiple implementation manners. In an implementation manner provided in the embodiment of the disclosure, Step S302 may be implemented by means of the following manners: receiving a broadcast message and/or an MCCH message sent by the eNB, the broadcast message or the MCCH message including: a subframe position of an S-MCCH message, and an RNTI corresponding to the S-MCCH message; detecting the S-MCCH message at the subframe position of the S-MCCH message indicated by the broadcast message and/or the MCCH message according to the RNTI corresponding to the S-MCCH message; and receiving the S-MCCH message.

It is important to note that the first RNTI configuration information includes, but is not limited to, a mapping relation between a TMGI and the first RNTI, and a time domain position of the first RNTI; and the second RNTI configuration information includes: a mapping relation between a TMGI and the second RNTI, the TMGI being used for identifying the MBMS. The time domain position includes, but is not limited to, a repetition period of a frame where the first RNTI is located, and a subframe offset of the first RNTI. The PDCCH scrambled by the first RNTI and/or the PDCCH scrambled by the second RNTI are/is stored in a common search space.

In the embodiment of the disclosure, after executing the technical solution in Step S202, the following technical solution may also be executed: blindly detecting a PDCCH for a UE at a subframe position where the S-MCCH message is located or a subframe position indicated by the S-MCCH message.

Herein, the technical solution of blindly detecting a PDCCH for a UE at a subframe position where the S-MCCH message is located or a subframe position indicated by the S-MCCH message may be implemented by means of the following technical solution: scrambling a CRC of a PDCCH detected, by the UE, at a subframe according to the first RNTI configuration information and/or the second RNTI configuration information in the S-MCCH message, and checking scrambled data, wherein when check succeeds, the current PDCCH that is blindly detected is determined as a required PDCCH.

Alternatively, the scheduling information is carried in DCI, and the method further includes:

when a scheduling manner indicated by the S-MCCH message is a semi-static scheduling manner, scrambling a PDCCH through the first RNTI configuration information, and carrying information for indicating activation of the semi-static scheduling manner and frequency domain scheduling information in the DCI; or when the scheduling manner indicated by the S-MCCH message is a semi-static scheduling manner, scrambling a PDCCH through the first RNTI configuration information, and carrying information for indicating release of the semi-static scheduling manner in the DCI.

When the semi-static scheduling manner has been activated, the UE directly reads an MBMS required on a PDSCH in a detected subframe where the first RNTI is located.

When the scheduling manner indicated by the S-MCCH message is a dynamic scheduling manner, the UE reads dynamic scheduling information in a PDCCH in each detected subframe where the second RNTI is located, and then reads an MBMS required on a PDSCH.

When the scheduling manner indicated by the S-MCCH message is the semi-static scheduling manner, if a first RNTI acquired through the S-MCCH message is different from the first activated RNTI, MBMS scheduling information corresponding to the first RNTI acquired through the S-MCCH message is read.

In one alternative example of the embodiment of the disclosure, the following technical solution is also included: receiving a broadcast message and/or an MCCH message sent by the eNB and used for indicating a third RNTI; and scrambling the S-MCCH message and a PDCCH of an S-MTCH multiplexing subframe through the third RNTI.

Herein, when each S-MTCH corresponds to a specified third RNTI, a mapping relation between a TMGI and the third RNTI is indicated through the MCCH message or the S-MCCH message.

Figure 4:
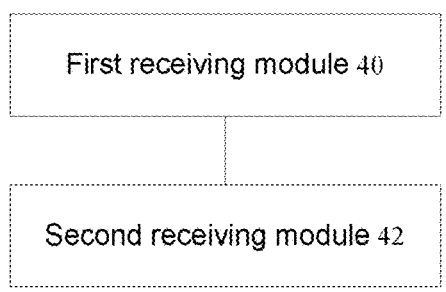
FIG. 4 is a block diagram of a scheduling device for a single-cell MBMS according to an embodiment of the disclosure.

In the present embodiment, a device for scheduling a single-cell MBMS is also provided. The device is used for implementing the above-mentioned embodiment and the exemplary implementation manner. Those which have been illustrated will not be elaborated herein. Modules involved in the device are illustrated below. Just as a term 'module' used below, the combination of software and/or hardware with predetermined functions may be implemented. Although the device described by the following embodiment is better implemented by software, the implementation of hardware or the combination of software and hardware may be possible and conceived. FIG. 4 is a block diagram of a scheduling device for a single-cell MBMS according to an embodiment of the disclosure. As shown in FIG. 4, the device includes:

a first receiving module 40, configured to receive an SC-PTM S-MCCH message sent by an eNB, wherein the S-MCCH message carries first RNTI configuration information and/or second RNTI configuration information, a first RNTI corresponding to the first RNTI configuration information is used for indicating that a single-cell MBMS is scheduled by using a semi-static scheduling manner, the first RNTI configuration information is used for indicating a TMGI corresponding to the first RNTI and a subframe position where a PDCCH scrambled by using the first RNTI is located, a second RNTI is used for indicating that the single-cell MBMS is scheduled by using a dynamic scheduling manner, and the second RNTI configuration information is used for indicating a TMGI corresponding to the second RNTI; and a second receiving module 42, connected to the first receiving module 40, and configured to receive an MBMS required on a PDSCH according to scheduling information received on the PDCCH scrambled by the first RNTI and/or a PDCCH scrambled by the second RNTI.

By means of the combined action of all the above-mentioned modules, the technical means of receiving an S-MCCH message that is sent by an eNB and carries first RNTI configuration information and/or second RNTI configuration information and further receiving an MBMS required on a PDSCH according to scheduling information received on a PDCCH scrambled by a first RNTI and/or a PDCCH scrambled by a second RNTI is adopted. The technical problem in the related art where there is no technical solution for implementing a scheduling process suitable for a single-cell MBMS is solved, thus avoiding a UE in a single cell from frequently decoding MBMS scheduling information, reducing the power consumption of the UE for receiving a single-cell MBMS, and implementing semi-static scheduling of the MBMS.

Herein, as shown in FIG. 5, the first receiving module 40 includes: a first receiving unit 400, configured to receive a broadcast message and/or an MCCH message sent by the eNB, the broadcast message or the MCCH message including: a subframe position of an S-MCCH message, and an RNTI corresponding to the S-MCCH message; a detection unit 402, connected to the first receiving unit 400, and configured to detect the S-MCCH message at the subframe position of the S-MCCH message indicated by the broadcast message and/or the MCCH message according to the RNTI corresponding to the S-MCCH message; and a second receiving unit 404, connected to the detection unit 402, and configured to receive the S-MCCH message.

It is important to note that the first RNTI configuration information received by the first receiving module 40 includes: a mapping relation between a TMGI and the first RNTI, and a time domain position of the first RNTI; and the second RNTI configuration information includes: a mapping relation between a TMGI and the second RNTI, the TMGI being used for identifying the MBMS. The time domain position received by the first receiving module 40 includes: a repetition period of a frame where the first RNTI is located, and a subframe offset of the first RNTI.

In one example of the embodiment of the disclosure, the device further includes: a detection module 44, configured to blindly detect a PDCCH for a UE at a subframe position where the S-MCCH message is located or a subframe position indicated by the S-MCCH message. In order to complete functions completed by the detection module 44, as shown in FIG. 4, the detection module further includes the following units: a scrambling unit 440, configured to scramble a CRC of a PDCCH detected, by the UE, at a subframe according to the first RNTI configuration information and/or the second RNTI configuration information in the S-MCCH message; and a check unit 442, connected to the scrambling unit 440, and configured to check scrambled data, wherein when check succeeds, the current PDCCH that is blindly detected is determined as a required PDCCH.

In order to perfect the above-mentioned technical solution, in the embodiment of the disclosure, a scheduling method for a single-cell MBMS is also provided. FIG. 6 is a flowchart of a scheduling method for a single-cell MBMS according to an embodiment of the disclosure. As shown in FIG. 6, the method includes the steps as follows.

Step S602: An SC-PTM S-MCCH message is sent to a UE, wherein the S-MCCH message carries: first RNTI configuration information and/or second RNTI configuration information, a first RNTI corresponding to the first RNTI configuration information is used for indicating that a single-cell MBMS is scheduled by using a semi-static scheduling manner, the first RNTI configuration information is used for indicating a TMGI corresponding to the first RNTI and a subframe position where a PDCCH scrambled by using the first RNTI is located, a second RNTI is used for indicating that the single-cell MBMS is scheduled by using a dynamic scheduling manner, and the second RNTI configuration information is used for indicating a TMGI corresponding to the second RNTI.

Step S604: A single-cell MBMS is scheduled according to a scheduling manner indicated by the S-MCCH message.

By means of each of the above-mentioned steps, the technical means of receiving an S-MCCH message that is sent by an eNB and carries first RNTI configuration information and/or second RNTI configuration information and further receiving an MBMS required on a PDSCH according to scheduling information received on a PDCCH scrambled by a first RNTI and/or a PDCCH scrambled by a second RNTI is adopted. The technical problem in the related art where there is no technical solution for implementing a scheduling process suitable for a single-cell MBMS is solved, thus avoiding a UE in a single cell from frequently decoding MBMS scheduling information, reducing the power consumption of the UE for receiving a single-cell MBMS, and implementing semi-static scheduling of the MBMS.

Step S602 may be implemented by means of the following manner: sending a broadcast message and/or an MCCH message to the UE, the broadcast message and/or the MCCH message being used for indicating a time domain position of an S-MCCH message and an RNTI corresponding to the S-MCCH message.

Herein, the first RNTI configuration information includes: a mapping relation between a TMGI and the first RNTI, and a time domain position of the first RNTI; and the second RNTI configuration information includes: a mapping relation between a TMGI and the second RNTI, the TMGI being used for identifying the MBMS. The time domain position includes: a repetition period of a frame where the first RNTI is located, and a subframe offset of the first RNTI.

Figure 7:
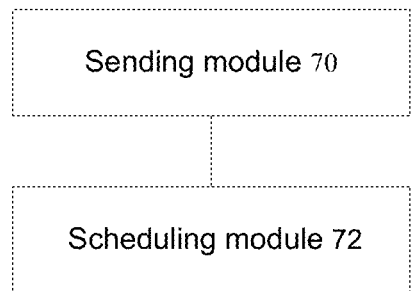
FIG. 7 is a further block diagram of a scheduling device for a single-cell MBMS according to an embodiment of the disclosure.

In the present embodiment, a device for scheduling a single-cell MBMS is also provided. The device is used for implementing the above-mentioned embodiment and the exemplary implementation manner. Those which have been illustrated will not be elaborated herein. Modules involved in the device are illustrated below. Just as a term 'module' used below, the combination of software and/or hardware with predetermined functions may be implemented. Although the device described by the following embodiment is better implemented by software, the implementation of hardware or the combination of software and hardware may be possible and conceived. FIG. 7 is a further block diagram of a scheduling device for a single-cell MBMS according to an embodiment of the disclosure. As shown in FIG. 7, the device includes:

a sending module 70, configured to send an SC-PTM S-MCCH message to a UE, wherein the S-MCCH message carries: first RNTI configuration information and/or second RNTI configuration information, a first RNTI corresponding to the first RNTI configuration information is used for indicating that a single-cell MBMS is scheduled by using a semi-static scheduling manner, the first RNTI configuration information is used for indicating a TMGI corresponding to the first RNTI and a subframe position where a PDCCH scrambled by using the first RNTI is located, a second RNTI is used for indicating that the single-cell MBMS is scheduled by using a dynamic scheduling manner, and the second RNTI configuration information is used for indicating a TMGI corresponding to the second RNTI; and a scheduling module 72, connected to the sending module 70, and configured to schedule a single-cell MBMS according to a scheduling manner indicated by the S-MCCH message.

By means of the combined action of all the above-mentioned modules, the technical means of receiving an S-MCCH message that is sent by an eNB and carries first RNTI configuration information and/or second RNTI configuration information and further receiving an MBMS required on a PDSCH according to scheduling information received on a PDCCH scrambled by a first RNTI and/or a PDCCH scrambled by a second RNTI is adopted. The technical problem in the related art where there is no technical solution for implementing a scheduling process suitable for a single-cell MBMS is solved, thus avoiding a UE in a single cell from frequently decoding MBMS scheduling information, reducing the power consumption of the UE for receiving a single-cell MBMS, and implementing semi-static scheduling of the MBMS.

Alternatively, the sending module 70 is configured to send a broadcast message and/or an MCCH message to the UE, the broadcast message and/or the MCCH message being used for indicating a time domain position of an S-MCCH message and an RNTI corresponding to the S-MCCH message.

In order to better understand a scheduling process for the MBMS, the scheduling process will be illustrated hereinbelow with reference to exemplary embodiments.

Figure 8:
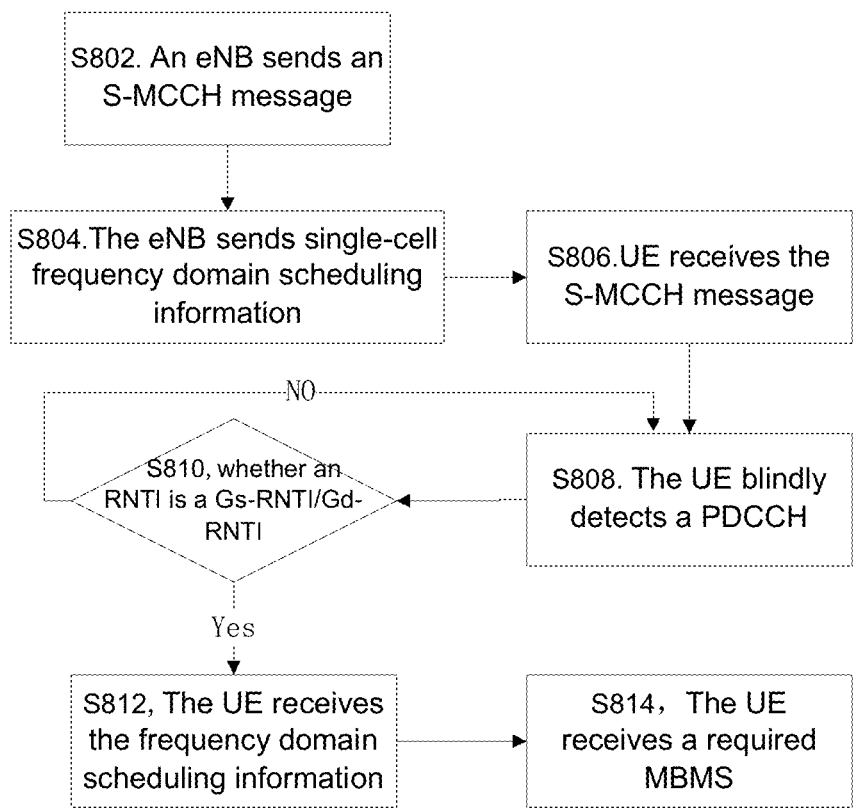
FIG. 8 is a flowchart showing scheduling of an MBMS according to a exemplary embodiment of the disclosure.

FIG. 8 is a flowchart showing scheduling of an MBMS according to a exemplary embodiment of the disclosure. As shown in FIG. 8, the flow includes the steps as follows.

Step S802: An eNB sends an S-MCCH message.

The S-MCCH message includes any one of the following: Group scheduling-RNTI (Gs-RNTI, equivalent to a first RNTI in the above-mentioned embodiment) configuration information, and Group dynamic-RNTI (Gd-RNTI, equivalent to a second RNTI in the above-mentioned embodiment) information, wherein the Gs-RNTI configuration information is used for indicating a Gs-RNTI corresponding to an MBMS and a time domain position where the Gs-RNTI is located, the time domain position including: a repetition period of a frame where the Gs-RNTI is located, and a subframe offset.

The eNB maps a TMGI to the Gs-RNTI, and indicates the position of a frame/subframe where the Gs-RNTI is located, the Gs-RNTI being used for identifying semi-static scheduling of the MBMS.

The Gs-RNTI is used for indicating dynamic scheduling information of the MBMS, and the Gd-RNTI information includes: a mapping relation between a Gd-RNTI and a TMGI. It is important to note that the Gs-RNTI configuration information and the Gd-RNTI configuration information may be put into the S-MCCH message simultaneously.

The Gs/d-RNTI is used for indicating a specific group, the length is 16 bits, and a CRC part of a PDCCH of a subframe configured by the eNB is scrambled.

Step S804: The eNB sends single-cell MBMS frequency domain scheduling information.

The frequency domain scheduling information is sent through a PDCCH, and particularly sent through DCI in the PDCCH.

The DCI at least includes: MBMS frequency domain scheduling information. It is important to note that on a PDCCH scrambled by the Gs-RNTI, when semi-static scheduling of the MBMS is activated, if a specific bit in the DCI is set to indicate activation of semi-static scheduling, MBMS resource configuration information is indicated on the DCI. At a subframe position of the Gs-RNTI corresponding to a next Gs-RNTI period, if MBMS resource configurations are not changed, it is unnecessary to indicate the MBMS resource configuration information in the DCI. If it is necessary to dynamically schedule MBMS resources at the above-mentioned subframe or other subframes, the PDCCH is scrambled by using the Gd-RNTI. If it is necessary to re-allocate semi-static scheduling resources, a new Gs-RNTI is allocated through an S-MCCH, and new MBMS resource configuration information is indicated by the new Gs-RNTI. If it is necessary to release semi-static scheduling, the PDCCH is scrambled by using the original Gs-RNTI for activating semi-static scheduling, and a specific bit is set in the DCI to indicate release of semi-static scheduling.

Step S806: A UE receives the S-MCCH message.

The UE has an MBMS receiving capability and is interested in receiving of an MBMS. Configuration information of the S-MCCH is indicated through a System Information Block (SIB) (such as SIB13), and the UE acquires the configuration information of the S-MCCH according to corresponding SIB indication information and receives the S-MCCH message at the corresponding position.

Step S808: The UE blindly detects the PDCCH.

The UE blindly detects the PDCCH at a subframe position indicated by the S-MCCH. The blind detection refers to:

scrambling a subframe CRC by using the Gs-RNTI/Gd-RNTI, and performing check through the CRC. If the check succeeds, the PDCCH is the required PDCCH, and otherwise, the blind detection is continuously performed.

The UE is RRC-Connected or RRC-Idle.

Step S810: The UE judges whether the RNTI is the Gs-RNTI/Gd-RNTI, if yes, Step S812 is executed, and otherwise, Step S808 is re-executed.

Step S812: The UE receives the single-cell MBMS frequency domain scheduling information.

The UE receives MBMS frequency domain scheduling information in the PDCCH, namely, receives DCI containing the MBMS frequency domain scheduling information.

Step S814: The UE receives a required MBMS.

The UE receives the required MBMS on a PDSCH according to the MBMS scheduling information in the DCI.

In order to make the purposes, technical solutions and advantages of the embodiments of the disclosure clearer, the technical solutions of the embodiments of the disclosure will be further illustrated in detail hereinbelow with reference to exemplary embodiments and the drawings.

Exemplary Embodiment 1

Figure 9:
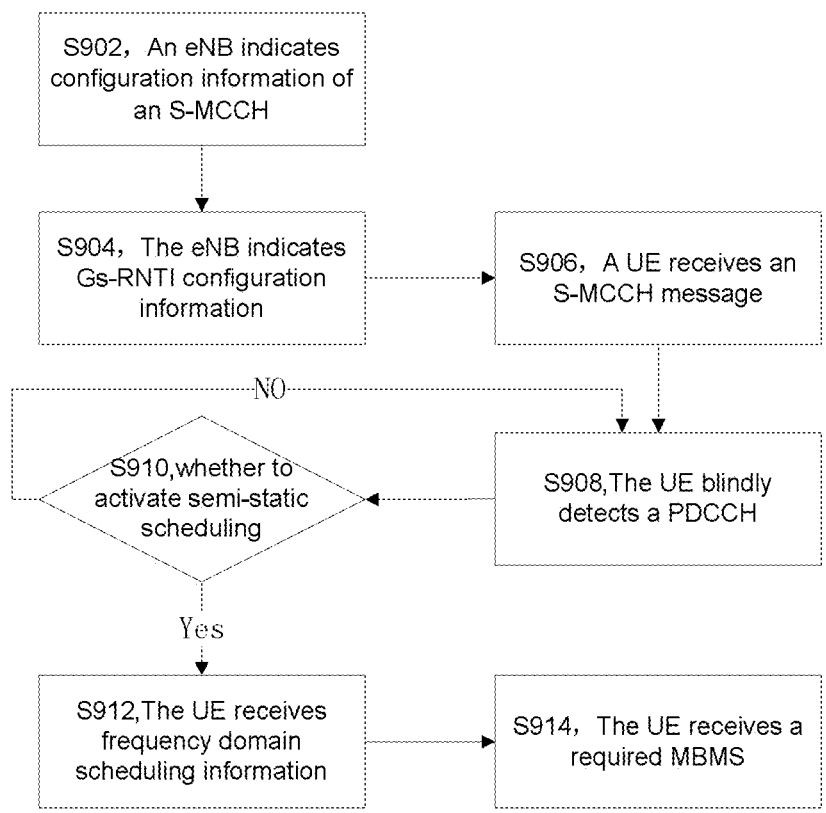
FIG. 9 is a flowchart according to exemplary Embodiment 1 of the disclosure.

A scenario of exemplary embodiment 1 is activation of semi-static scheduling of an MBMS. It is supposed that semi-static scheduling of the MBMS has not been activated yet. FIG. 9 is a flowchart according to exemplary embodiment 1 of the disclosure. As shown in FIG. 9, the present example includes the steps as follows.

Step S902: An eNB indicates configuration information of an S-MCCH through an SIB.

The SIB is an existing MBMS system message such as SIB13 or SIB15. The S-MCCH is an MCCH corresponding to a single cell, and the configuration information is information about a subframe position where the S-MCCH is located, which is, for example, specified by a frame period, a subframe offset.

Step S904: The eNB indicates Gs-RNTI-related configuration information through the S-MCCH.

The Gs-RNTI configuration information at least includes: a mapping relation between a TMGI and a Gs-RNTI, and information about a time domain position of the Gs-RNTI, the time domain position including: a frame period and a subframe offset.

Step S906: A UE receives an S-MCCH message.

The UE receives the S-MCCH message according to S-MCCH message position information indicated by the SIB.

Step S908: The UE blindly detects a PDCCH.

The UE determines the position of the PDCCH according to configuration information of the Gs-RNTI in the received S-MCCH message, and blindly detects the PDCCH at the above-mentioned position.

The blind detection refers to: the UE scrambles a subframe CRC by using the Gs-RNTI, and then performs check. If the check succeeds, the PDCCH is the required PDCCH, and otherwise, the blind detection is continuously performed.

Step S910: The UE judges whether to activate semi-static scheduling, if yes, Step S912 is executed, and otherwise, Step S908 is re-executed.

The activation refers to: successfully performing check through the CRC scrambled by the Gs-RNTI, and forming a corresponding field indication (activation of semi-static scheduling) in the DCI. If the CRC-based check succeeds whilst there is no field indication in the DCI, the PDCCH may be a subsequent PDCCH after the semi-static scheduling is activated, or the semi-static scheduling is released. In this case, the PDCCH is continuously and blindly detected.

When the semi-static scheduling is activated, there is corresponding MBMS resource configuration information on the PDCCH of an activated subframe.

Step S912: The UE reads MBMS scheduling information.

The semi-static scheduling is activated, and the UE reads the MBMS resource configuration information on the PDCCH.

Step S914: The UE receives a required MBMS.

The UE receives the required MBMS on a PDSCH according to the MBMS scheduling information on the PDCCH.

Exemplary Embodiment 2

Figure 10:
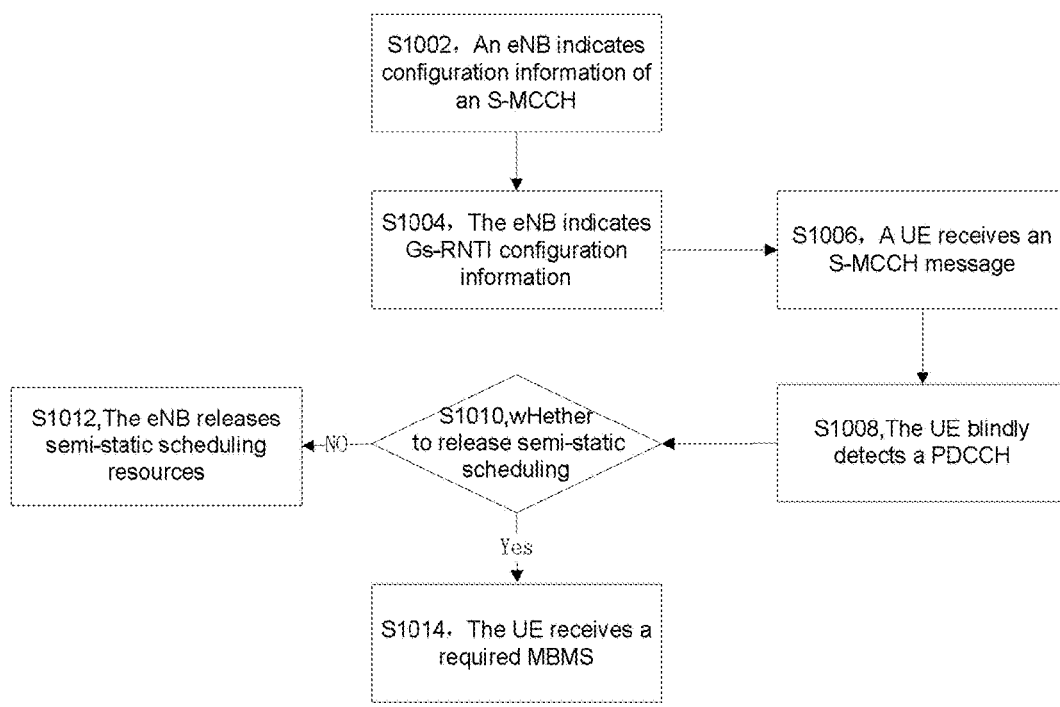
FIG. 10 is a flowchart according to exemplary Embodiment 2 of the disclosure.

A scenario of the present embodiment is release of semi-static scheduling of an MBMS. It is supposed that semi-static scheduling of the MBMS has been activated. FIG. 10 is a flowchart according to exemplary embodiment 2 of the disclosure. As shown in FIG. 10, the present embodiment includes the steps as follows.

Step S1002: An eNB indicates configuration information of an S-MCCH through an SIB.

The SIB is an existing MBMS system message such as SIB13 or SIB15. The S-MCCH is an MCCH corresponding to a single cell, and the configuration information is information about a subframe position where the S-MCCH is located, which is, for example, specified by a frame period, a subframe offset.

Step S1004: The eNB indicates Gs-RNTI-related configuration information through the S-MCCH.

The Gs-RNTI configuration information at least includes: a mapping relation between a TMGI and a Gs-RNTI, and information about a time domain position of the Gs-RNTI, the time domain position including: a frame period and a subframe offset.

Step S1006: A UE receives an S-MCCH message.

The UE receives the S-MCCH message according to S-MCCH message position information indicated by the SIB.

Step S1008: The UE blindly detects a PDCCH.

The UE determines the position of the PDCCH according to configuration information of the Gs-RNTI in the received S-MCCH message, and blindly detects the PDCCH at the above-mentioned position.

The blind detection refers to: the UE scrambles a subframe CRC by using the Gs-RNTI, and then performs check. If the check succeeds, the PDCCH is the required PDCCH, and otherwise, the blind detection is continuously performed.

Step S1010: The UE judges whether to release semi-static scheduling, if yes, Step S1012 is executed, and otherwise, Step S1014 is executed.

The release of semi-static scheduling refers to: successfully performing check through the CRC scrambled by the Gs-RNTI, and forming a corresponding field indication (release of semi-static scheduling) in the DCI. The field indication is different from the field indication for activating the semi-static scheduling in Step 205. If a field bit indicating activation/release is 1, activation is indicated. If the field bit is 0, release is indicated.

It is important to note that a subframe for releasing the semi-static scheduling is generally different from a semi-static scheduling subframe configured by the S-MCCH in position.

Step S1012: The eNB releases semi-static scheduling resources.

The UE determines to release the semi-static scheduling, so the eNB releases the corresponding semi-static scheduling resources. It is important to note that after the eNB sends an indication for releasing the semi-static scheduling, the corresponding resources can be released. That is, it is unnecessary to release the resources when the UE receives a release indication message.

Step S1014: The UE receives a required MBMS.

In view of that the semi-static scheduling has been activated and is not released, it is shown that the PDCCH is a subsequent semi-static scheduling indication subframe, that is, the DCI of the PDCCH does not contain semi-static scheduling information, and the UE receives the required MBMS according to resource allocation information during activation of the semi-static scheduling.

Exemplary Embodiment 3

Figure 11:
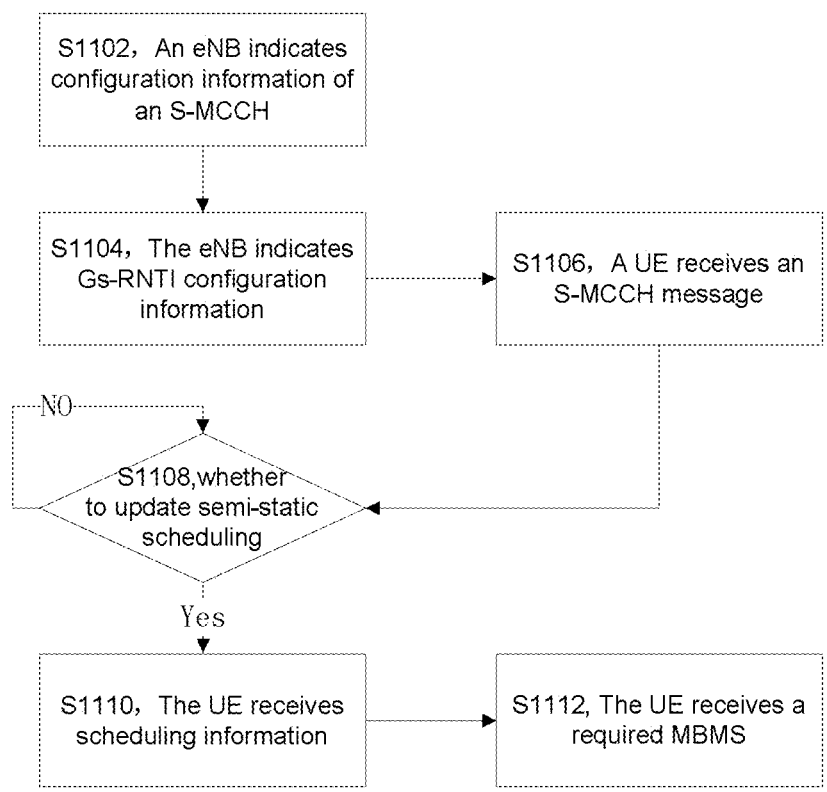
FIG. 11 is a flowchart according to exemplary Embodiment 3 of the disclosure.

A scenario of the present embodiment is update of semi-static scheduling information. It is supposed that semi-static scheduling of an MBMS has been activated. FIG. 11 is a flowchart according to exemplary embodiment 3 of the disclosure. As shown in FIG. 11, the present embodiment includes the steps as follows.

Step S1102: An eNB indicates configuration information of an S-MCCH through an SIB.

The SIB is an existing MBMS system message such as SIB13 or SIB15. The S-MCCH is an MCCH corresponding to a single cell, and the configuration information is information about a subframe position where the S-MCCH is located, which is, for example, specified by a frame period, a subframe offset.

Step S1104: The eNB indicates Gs-RNTI-related configuration information through the S-MCCH.

The Gs-RNTI configuration information at least includes: a mapping relation between a TMGI and a Gs-RNTI, and information about a time domain position of the Gs-RNTI, the time domain position including: a frame period and a subframe offset.

Step S1106: A UE receives an S-MCCH message.

The UE receives the S-MCCH message according to S-MCCH message position information indicated by the SIB.

Step S1108: The UE judges whether to update semi-static scheduling, if yes, Step S1110 is executed, and otherwise, blind detection is continuously performed.

The UE blindly detects a PDCCH.

The UE determines the position of the PDCCH according to configuration information of the Gs-RNTI in the received S-MCCH message, and blindly detects the PDCCH at the above-mentioned position.

The blind detection refers to: the UE scrambles a subframe CRC by using the Gs-RNTI, and then performs check. If the check succeeds, the PDCCH is the required PDCCH, and otherwise, the blind detection is continuously performed.

The update of semi-static scheduling refers to: the Gs-RNTI received by the UE through the S-MCCH is different from the original activated Gs-RNTI, and the UE succeeds in blind detection through a new Gs-RNTI.

It is important to note that a subframe for updating the semi-static scheduling is generally different from a semi-static scheduling subframe previously configured by the S-MCCH in position, and the PDCCH at the subframe for updating the semi-static scheduling has new MBMS scheduling information.

Step S1110: The UE receives MBMS frequency domain scheduling information.

The UE receives updated MBMS scheduling information on the PDCCH.

Step S1112: The UE receives a required MBMS.

The UE receives the required MBMS on a PDSCH according to updated semi-static scheduling information.

Exemplary Embodiment 4

Figure 12:
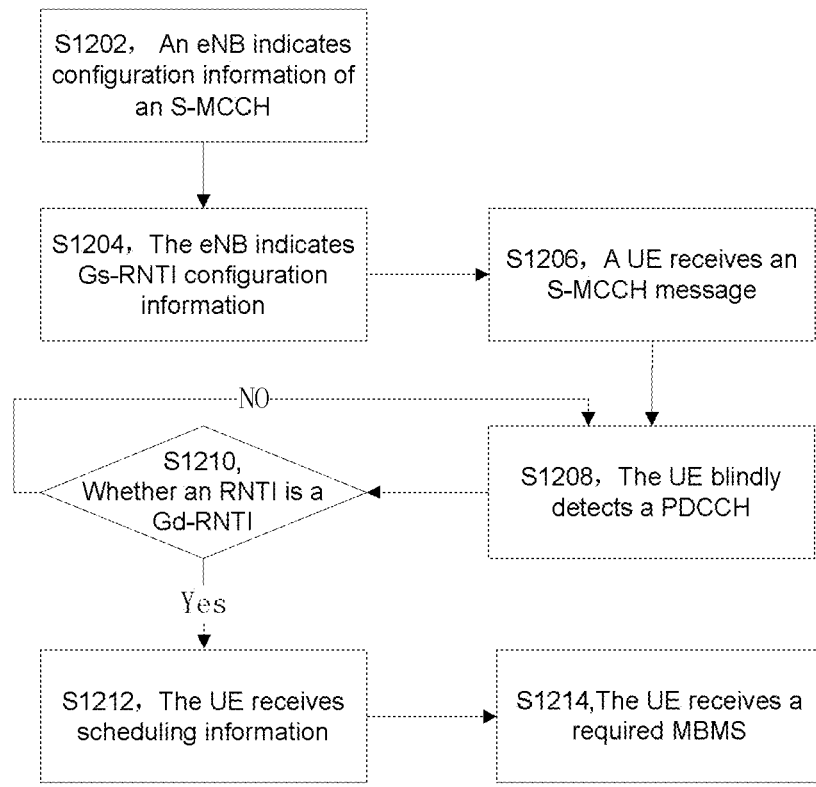
FIG. 12 is a flowchart according to exemplary Embodiment 4 of the disclosure.

A scenario of the present exemplary embodiment is that MBMS dynamic scheduling information is sent by using DCI scrambled by a Gd-RNTI. FIG. 12 is a flowchart according to exemplary embodiment 4 of the disclosure. As shown in FIG. 12, the present exemplary embodiment includes the steps as follows.

Step S1202: An eNB indicates configuration information of an S-MCCH through an SIB.

The present step is the same as Step S802, and will not be elaborated herein.

Step S1204: The eNB indicates Gd-RNTI information through the S-MCCH.

The Gd-RNTI configuration information at least includes: a mapping relation between a TMGI and a Gd-RNTI, and period or subframe configurations of the Gd-RNTI.

It is important to note that the Gd-RNTI information may be indicated in the same S-MCCH with the Gs-RNTI configuration information in Step 202.

Step S1206: A UE receives an S-MCCH message.

The present step is the same as Step S806, and will not be elaborated herein.

Step S1208: The UE blindly detects a PDCCH.

The UE determines the position of the PDCCH according to configuration information of the Gd-RNTI in the received S-MCCH message, and blindly detects the PDCCH at the above-mentioned position.

The blind detection refers to: the UE checks a subframe by using a CRC scrambled by the Gd-RNTI.

Step S1210: The UE judges whether the CRC is scrambled by the Gd-RNTI. If yes, Step S1212 is executed, and otherwise, Step S1208 is re-executed.

The judgment performs check through the CRC scrambled by the Gd-RNTI, if the check succeeds, it is shown that dynamic scheduling information is required, and otherwise, the PDCCH is continuously monitored.

Step S1212: The UE reads MBMS frequency domain scheduling information.

The UE reads MBMS scheduling information on DCI in the PDCCH.

Step S1214: The UE receives a required MBMS.

The UE acquires the required MBMS on a PDSCH according to the read MBMS scheduling information.

Figure 13:
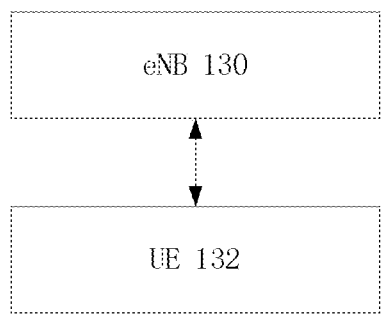
FIG. 13 is a composition structure diagram of a single-cell scheduling system according to a exemplary embodiment of the disclosure.

FIG. 13 is a composition structure diagram of a single-cell scheduling system according to a exemplary embodiment of the disclosure. The system includes: an eNB 130 and a UE 132.

The eNB 130 is configured to send an SIB, an S-MCCH message, MBMS scheduling information and MBMS data, and also configured to scramble a CRC of a PDCCH by using a Gs-RNTI/Gd-RNTI.

The UE 61 is configured to receive the SIB, the S-MCCH message, the MBMS scheduling information and the MBMS data, sent by the eNB 130, and also configured to blindly detect the PDCCH.

Figure 14:
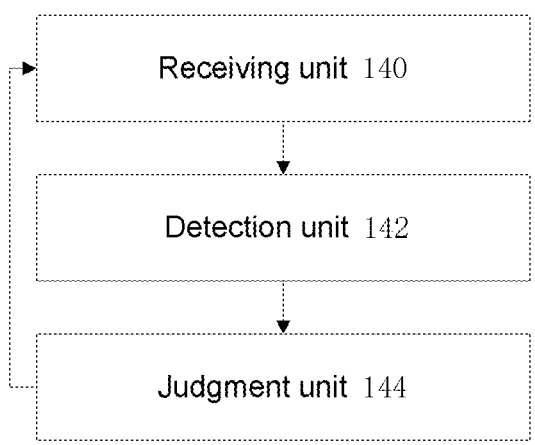
FIG. 14 is a composition structure diagram of a UE according to a exemplary embodiment of the disclosure.

FIG. 14 is a composition structure diagram of a UE according to a exemplary embodiment of the disclosure. The UE includes: a receiving unit 140, a detection unit 142 and a judgment unit 144.

The receiving unit 140 is configured to receive an SIB, an S-MCCH message, MBMS scheduling information and MBMS data.

The detection unit 142 is configured to blindly detect a PDCCH of a subframe indicated in an S-MCCH.

The judgment unit 144 is configured to determine, according to a detection result, whether scheduling information on the PDCCH is indicative of activation, release or update of semi-static scheduling.

To sum up, the embodiments of the disclosure achieve the following technical effects: the technical problem in the related art where there is no technical solution for implementing a scheduling process suitable for a single-cell MBMS is solved, thus avoiding a UE in a single cell from frequently decoding MBMS scheduling information, reducing the power consumption of the UE for receiving a single-cell MBMS, and implementing semi-static scheduling of the MBMS.

In another embodiment, software is also provided. The software is used for executing the technical solution described in the above-mentioned embodiments and exemplary implementation manners.

In another embodiment, a storage medium is also provided. The above-mentioned software is stored in the storage medium. The storage medium includes, but is not limited to, an optical disk, a floppy disk, a hard disk, an erasable memory and the like.

It is important to note that the description and claims of the disclosure and terms "first", "second" and the like in the drawings are intended to distinguish similar objects, and do not need to describe a specific sequence or a precedence order. It should be understood that objects used in such way can be exchanged under appropriate conditions, in order that the embodiments of the disclosure described here can be implemented in a sequence except sequences graphically shown or described here. In addition, terms "include" and "have" and any inflexions thereof are intended to cover non-exclusive inclusions. For example, processes, methods, systems, products or devices containing a series of steps or units do not need to clearly show those steps or units, and can include other inherent steps or units of these processes, methods, products or devices, which are not clearly shown.

Obviously, a person skilled in the art should understand that all of the above-mentioned modules or steps in the disclosure may be implemented by using a general calculation device, may be centralized on a single calculation device or may be distributed on a network composed of multiple calculation devices. Alternatively, they may be implemented by using executable program codes of the calculation devices. Thus, they may be stored in a storage device and executed by the calculation devices, the shown or described steps may be executed in a sequence different from this sequence under certain conditions, or they are manufactured into each integrated circuit module respectively, or multiple modules or steps therein are manufactured into a single integrated circuit module. Thus, the disclosure is not limited to a combination of any specific hardware and software.

The above is only the exemplary embodiments of the disclosure, and not intended to limit the disclosure. As will occur to a person skilled in the art, the disclosure is susceptible to various modifications and changes. Any modifications, equivalent replacements, improvements and the like made within the spirit and principle of the disclosure should fall within the scope of protection of the disclosure.

INDUSTRIAL APPLICABILITY

The technical solution in the embodiments of the disclosure can be applied to an MBMS scheduling process, and adopts the following technical means: receiving an SC-PTM S-MCCH message sent by an eNB, wherein the S-MCCH message carries first RNTI configuration information and/or second RNTI configuration information, a first RNTI is used for indicating that a single-cell MBMS is scheduled by using a semi-static scheduling manner, the first RNTI configuration information is used for indicating a TMGI corresponding to the first RNTI and a subframe position where a PDCCH scrambled by using the first RNTI is located, a second RNTI is used for indicating that the single-cell MBMS is scheduled by using a dynamic scheduling manner, and the second RNTI configuration information is used for indicating a TMGI corresponding to the second RNTI; and receiving an MBMS required on a PDSCH according to scheduling information received on the PDCCH. The technical problem in the related art where there is no technical solution for implementing a scheduling process suitable for a single-cell MBMS is solved, thus avoiding a UE in a single cell from frequently decoding MBMS scheduling information, reducing the power consumption of the UE for receiving a single-cell MBMS, and implementing semi-static scheduling of the MBMS.

What is claimed is:

1. A method for scheduling a single-cell Multimedia Broadcast and Multicast Service (MBMS), comprising:
   receiving a Single Cell-Point To Multipoint (SC-PTM) Single cell-Multicast Control Channel (S-MCCH) message sent by an evolved Node B (eNB), wherein the S-MCCH message carries first Radio Network Temporary Identifier (RNTI) configuration information and/or second RNTI configuration information, a first RNTI corresponding to the first RNTI configuration information is used for indicating that a single-cell MBMS is scheduled by using a semi-static scheduling manner, the first RNTI configuration information is used for indicating a Temporarily Mobile Group Identifier (TMGI) corresponding to the first RNTI and a subframe position where a Physical Downlink Control Channel (PDCCH) scrambled by using the first RNTI is located, a second RNTI is used for indicating that the single-cell MBMS is scheduled by using a dynamic scheduling manner, and the second RNTI configuration information is used for indicating a TMGI corresponding to the second RNTI; and
   receiving an MBMS required on a Physical Downlink Shared Channel (PDSCH) according to scheduling information received on the PDCCH scrambled by the first RNTI and/or received on a PDCCH scrambled by the second RNTI.

2. The method as claimed in claim 1, wherein receiving an S-MCCH message sent by an eNB comprises:
   receiving a broadcast message and/or an MCCH message sent by the eNB, the broadcast message or the MCCH message comprising: a subframe position of an S-MCCH message, and an RNTI corresponding to the S-MCCH message;
   detecting the S-MCCH message at the subframe position of the S-MCCH message indicated by the broadcast message and/or the MCCH message according to the RNTI corresponding to the S-MCCH message; and
   receiving the S-MCCH message.

3. The method as claimed in claim 1, wherein the first RNTI configuration information comprises: a mapping relation between a TMGI and the first RNTI, and a time domain position of the first RNTI; and the second RNTI configuration information comprises: a mapping relation between a TMGI and the second RNTI, the TMGI being used for identifying the MBMS
wherein the time domain position comprises a repetition period of a frame where the first RNTI is located and a subframe offset of the first RNTI.

4. The method as claimed in claim 1, wherein the PDCCH scrambled by the first RNTI and/or the PDCCH scrambled by the second RNTI are/is stored in a common search space.

5. The method as claimed in claim 1, wherein after receiving the S-MCCH message sent by the eNB, the method further comprises:
blindly detecting a PDCCH for a User Equipment (UE) at a subframe position where the S-MCCH message is located or a subframe position indicated by the S-MCCH message.

6. The method as claimed in claim 5, wherein blindly detecting a PDCCH for a UE at a subframe position where the S-MCCH message is located or a subframe position indicated by the S-MCCH message comprises:
scrambling a Cyclic Redundancy Check code (CRC) of a PDCCH detected, by the UE, at a subframe according to the first RNTI configuration information and/or the second RNTI configuration information in the S-MCCH message, and checking scrambled data, wherein when check succeeds, the current PDCCH that is blindly detected is determined as a required PDCCH.

7. The method as claimed in claim 1, wherein the scheduling information is carried in Downlink Control Information (DCI), the method further comprising:
when a scheduling manner indicated by the S-MCCH message is a semi-static scheduling manner, scrambling a PDCCH through the first RNTI configuration information, and carrying information for indicating activation of the semi-static scheduling manner and frequency domain scheduling information in the DCI; or
when the scheduling manner indicated by the S-MCCH message is a semi-static scheduling manner, scrambling a PDCCH through the first RNTI configuration information, and carrying information for indicating release of the semi-static scheduling manner in the DCI.

8. The method as claimed in claim 7, further comprising:
when the semi-static scheduling manner has been activated, directly reading, by the UE, an MBMS required on a PDSCH in a detected subframe where the first RNTI is located; and
when the scheduling manner indicated by the S-MCCH message is a dynamic scheduling manner, reading, by the UE, dynamic scheduling information in a PDCCH in each detected subframe where the second RNTI is located, and then reading an MBMS required on a PDSCH.

9. The method as claimed in claim 1, further comprising:
when the scheduling manner indicated by the S-MCCH message is the semi-static scheduling manner, if a first RNTI acquired through the S-MCCH message is different from the first activated RNTI, reading MBMS scheduling information corresponding to the first RNTI acquired through the S-MCCH message.

10. The method as claimed in claim 1, further comprising:
receiving a broadcast message and/or an MCCH message sent by the eNB and used for indicating a third RNTI; and
scrambling the S-MCCH message and a PDCCH of an S-MTCH multiplexing subframe through the third RNTI.

11. The method as claimed in claim 10, further comprising:
when each S-MTCH corresponds to a specified third RNTI, indicating a mapping relation between a TMGI and the third RNTI through the MCCH message or the S-MCCH message.

12. A method for scheduling a single-cell Multimedia Broadcast and Multicast Service (MBMS), comprising:
sending a Single Cell-Point To Multipoint (SC-PTM) Single cell-Multicast Control Channel (S-MCCH) message to a User Equipment (UE), wherein the S-MCCH message carries: first Radio Network Temporary Identifier (RNTI) configuration information and/or second RNTI configuration information, a first RNTI corresponding to the first RNTI configuration information is used for indicating that a single-cell MBMS is scheduled by using a semi-static scheduling manner, the first RNTI configuration information is used for indicating a Temporarily Mobile Group Identifier (TMGI) corresponding to the first RNTI and a subframe position where a Physical Downlink Control Channel (PDCCH) scrambled by using the first RNTI is located, a second RNTI is used for indicating that the single-cell MBMS is scheduled by using a dynamic scheduling manner, and the second RNTI configuration information is used for indicating a TMGI corresponding to the second RNTI; and
scheduling a single-cell MBMS according to a scheduling manner indicated by the S-MCCH message.

13. The method as claimed in claim 12, wherein sending an SC-PTM S-MCCH message to a UE comprises:
sending a broadcast message and/or an MCCH message to the UE, the broadcast message and/or the MCCH message being used for indicating a time domain position of an S-MCCH message and an RNTI corresponding to the S-MCCH message.

14. The method as claimed in claim 12, wherein the first RNTI configuration information comprises: a mapping relation between a TMGI and the first RNTI, and a time domain position of the first RNTI; and the second RNTI configuration information comprises: a mapping relation between a TMGI and the second RNTI, the TMGI being used for identifying the MBMS;
wherein the time domain position comprises a repetition period of a frame where the first RNTI is located and a subframe offset of the first RNTI.

15. A device for scheduling a single-cell Multimedia Broadcast and Multicast Service (MBMS), comprising:
a first receiving module, configured to receive a Single Cell-Point To Multipoint (SC-PTM) Single cell-Multicast Control Channel (S-MCCH) message sent by an evolved Node B (eNB), wherein the S-MCCH message carries first Radio Network Temporary Identifier (RNTI) configuration information and/or second RNTI configuration information, a first RNTI corresponding to the first RNTI configuration information is used for indicating that a single-cell MBMS is scheduled by using a semi-static scheduling manner, the first RNTI configuration information is used for indicating a Temporarily Mobile Group Identifier (TMGI) corresponding to the first RNTI and a subframe position where a Physical Downlink Control Channel (PDCCH) scrambled by using the first RNTI is located, a second RNTI is used for indicating that the single-cell MBMS is scheduled by using a dynamic scheduling manner, and the second RNTI configuration information is used for indicating a TMGI corresponding to the second RNTI; and a second receiving module, configured to receive an MBMS required on a Physical Downlink Shared Channel (PDSCH) according to scheduling information received on the PDCCH scrambled by the first RNTI and/or received on the PDCCH scrambled by the second RNTI.

16. The device as claimed in claim 15, wherein the first RNTI configuration information received by the first receiving module comprises: a mapping relation between a TMGI and the first RNTI, and a time domain position of the first RNTI; and the second RNTI configuration information comprises: a mapping relation between a TMGI and the second RNTI, the TMGI being used for identifying the MBMS.

17. The device as claimed in claim 16, wherein the time domain position received by the first receiving module comprises a repetition period of a frame where the first RNTI is located and a subframe offset of the first RNTI.

* * * * *